(12) United States Patent
Heo

(10) Patent No.: US 7,301,921 B2
(45) Date of Patent: Nov. 27, 2007

(54) METHOD OF REDUCING ACCESS TIME TO UTRAN IN UMTS

(75) Inventor: Won-Suk Heo, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1132 days.

(21) Appl. No.: 10/314,772

(22) Filed: Dec. 9, 2002

(65) Prior Publication Data

US 2003/0139170 A1    Jul. 24, 2003

(30) Foreign Application Priority Data

Dec. 10, 2001 (KR) ............................... 2001-77970

(51) Int. Cl.
*H04Q 7/00* (2006.01)
(52) U.S. Cl. ..................... 370/329; 370/348
(58) Field of Classification Search ................ 370/312, 370/328–329, 335; 455/450, 455
See application file for complete search history.

(56) References Cited

U.S. PATENT DOCUMENTS

| | | | | |
|---|---|---|---|---|
| 6,643,318 | B1 * | 11/2003 | Parsa et al. ................. | 375/141 |
| 6,778,835 | B2 * | 8/2004 | You et al. .................... | 455/455 |
| 7,075,971 | B2 * | 7/2006 | Parsa et al. ................. | 375/141 |
| 2001/0024956 | A1 * | 9/2001 | You et al. .................... | 455/455 |
| 2002/0137548 | A1 * | 9/2002 | Miya .......................... | 455/562 |
| 2003/0058972 | A1 * | 3/2003 | Iochi .......................... | 375/343 |
| 2003/0095528 | A1 * | 5/2003 | Halton et al. ................ | 370/342 |
| 2004/0081115 | A1 * | 4/2004 | Parsa et al. ................. | 370/320 |
| 2006/0126573 | A1 * | 6/2006 | Dick et al. .................. | 370/335 |
| 2006/0203753 | A1 * | 9/2006 | Toskala et al. ............. | 370/278 |

FOREIGN PATENT DOCUMENTS

| | | | |
|---|---|---|---|
| EP | 1217854 A1 * | 6/2002 | |
| EP | 1307009 A1 * | 5/2003 | |
| WO | WO01/10158 * | 2/2001 | |
| WO | WO0178269 A1 * | 10/2001 | |

OTHER PUBLICATIONS

ETSI TS 125 303 UMTS Interlayer Procedures in Connected Mode, 1999.*
Shulist et al. (Acknowledgement of 3GPP WCDMA Random and Packet Access Applying Space-Time Transmit-Diversity, 2001.*

* cited by examiner

*Primary Examiner*—Hassan Kizou
*Assistant Examiner*—Salman Ahmed
(74) *Attorney, Agent, or Firm*—The Farrell Law Firm, P.C.

(57) ABSTRACT

A method of reducing access time to a UTRAN in UMTS. Upon receipt of a preamble signature from a UE, the UTRAN determines whether the preamble signature is in current use. If the preamble signature corresponds to an available RACH, the UTRAN transmits a positive AICH to the UE. If the preamble signature corresponds to an RACH in current use, the UTRAN determines whether there is a signature corresponding to an available RACH. If all signatures are in use, the UTRAN transmits a negative AICH to the UE.

2 Claims, 3 Drawing Sheets

METHOD OF REDUCING ACCESS TIME TO UTRAN IN UMTS

PRIORITY

This application claims priority to an application entitled "Method of Reducing Access Time to UTRAN in UMTS" filed in the Korean Industrial Property Office on Dec. 10, 2001 and assigned Ser. No. 2001-77970, the contents of which are herein incorporated by reference.

BACKGROUND OF THE INVENTION

1. Field of the Invention

The present invention relates generally to a method of accessing a UTRAN (UMTS Terrestrial Radio Access Network) by a UE (User Equipment) in UMTS (Universal Mobile Telecommunication System), and in particular, to a method of reducing access time to a UTRAN.

2. Description of the Related Art

In general, a UE transmits only a preamble to a UTRAN at an access attempt. Upon receipt of the preamble, the UTRAN is synchronized to the UE and notifies the UE that the synchronization is completed via an AICH (Acquisition Indication Channel).

In UMTS, the UE uses an RACH (Random Access Channel) to access the UTRAN. When attempting a call, the UE transmits an RRC (Radio Resource Control) Connection message to the UTRAN on the RACH. Besides, the RACH is used for cell update, transmission of a URA (UTRAN Registration Area) update message, and transmission of a very small amount of data in a Cell_FACH state, in the case where the UE is connected to the UTRAN. Now a brief description of the RACH will be given below with respect to FIG. 1.

FIG. 1 is a flowchart illustrating a conventional UTRAN operation after receiving a preamble signature from a UE.

Information about available sub-channels and available preamble signatures according to ASC (Access Service Class) is included in PRACH (Physical RACH) information (or PRACH information). According to the PRACH information, a preamble signature is assigned to a UE depending on what ASC the UE intends to use on an available RACH sub-channel. The preamble signature is determined uniformly, randomly based on the IMSI (International Mobile Subscriber Identity) of the UE and time information. After the preamble signature is determined, access slots for the preamble are determined. When there are no available access slots, the next slot set is considered. Then, the UE transmits to the UTRAN the preamble with the determined signature in the access slots with predetermined power.

Upon receipt of the preamble signature in step 100, the UTRAN checks for the signatures in step 110, and the UTRAN determines whether an RACH corresponding to the preamble signature is in use in step 120. If the RACH is not used, the UTRAN transmits the AICH to the UE. On the other hand, if the RACH is in use, the UTRAN transmits a negative AICH to the UE in step 130.

Meanwhile, if the UE fails to receive the AICH from the UTRAN, it determines next access slots, a preamble signature uniformly random, and retransmits the preamble signature with power increased by a power ramp step. In case of negative AICH, the UE terminates the access procedure. In this case, since another UE is using the current preamble signature, the UE re-attempts an access after a back-off delay ($TB01=NB01\times10$ ms). Here, minimum and maximum values in RACH transmission parameters of a BCH are received as NB01.

In case of positive AICH, the UE transmits a RACH message with power increased by $Pp-m[dB]$ from the last preamble to the UTRAN.

In the above-described manner, the RACH is used in UMTS. The UTRAN transmits a negative AICH to a UE when different UEs including the UE use the current signature for an RACH or access using different signatures corresponding to the same RACH in the same access slot. Upon receipt of the negative AICH, the UE re-initiates the RACH procedure after a back-off delay ($TB01=NB01\times10$ ms).

Even if the system supports a plurality of RACHs and there remain available RACHs, the unnecessary access delay occurs when preamble signatures collide or signatures corresponding to the same RACH are used when accessing because no determination is made as to availability of remaining RACHs.

SUMMARY OF THE INVENTION

It is, therefore, an object of the present invention to provide a method of preventing the increase of access time to a UTRAN despite collision between preamble signatures in a system supporting a plurality of PRACHs.

It is another object of the present invention to provide a method of reducing access time to a UTRAN by selecting a different PRACH when the PRACH is available.

To achieve the above and other objects, upon receipt of a preamble signature from a UE, a UTRAN determines whether the preamble signature is in current use. If the preamble signature corresponds to an available RACH, the UTRAN transmits a positive AICH to the UE. If the preamble signature corresponds to an RACH in current use, the UTRAN determines whether there is a signature corresponding to an available RACH. If all signatures are in use, the UTRAN transmits a negative AICH to the UE.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The present invention provides a method for reducing access time being an access delay time when a UE accesses a system on an RACH. In accordance with the present invention, when a UE transmits a preamble signature corresponding to a PRACH in current use to a UTRAN, or accesses the UTRAN using a different signature corresponding to the same PRACH in the same access slot, an average access time is reduced by changing the response for the case in the existing RACH procedure.

The present invention is applied to a system supporting a plurality of physical channels. Whether the present invention is applied or not is determined by user selection in already known ways.

Figure 1:
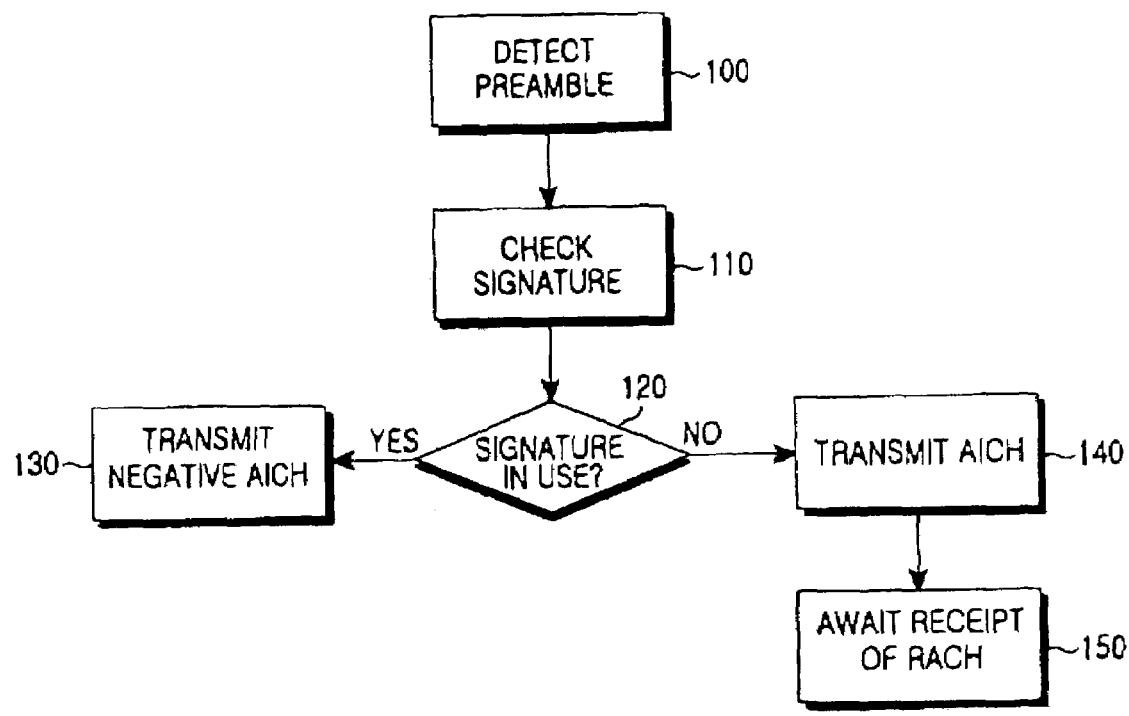
FIG. 1 is a flowchart illustrating a conventional UTRAN operation after receiving a preamble signature from a UE.
Figure 2:
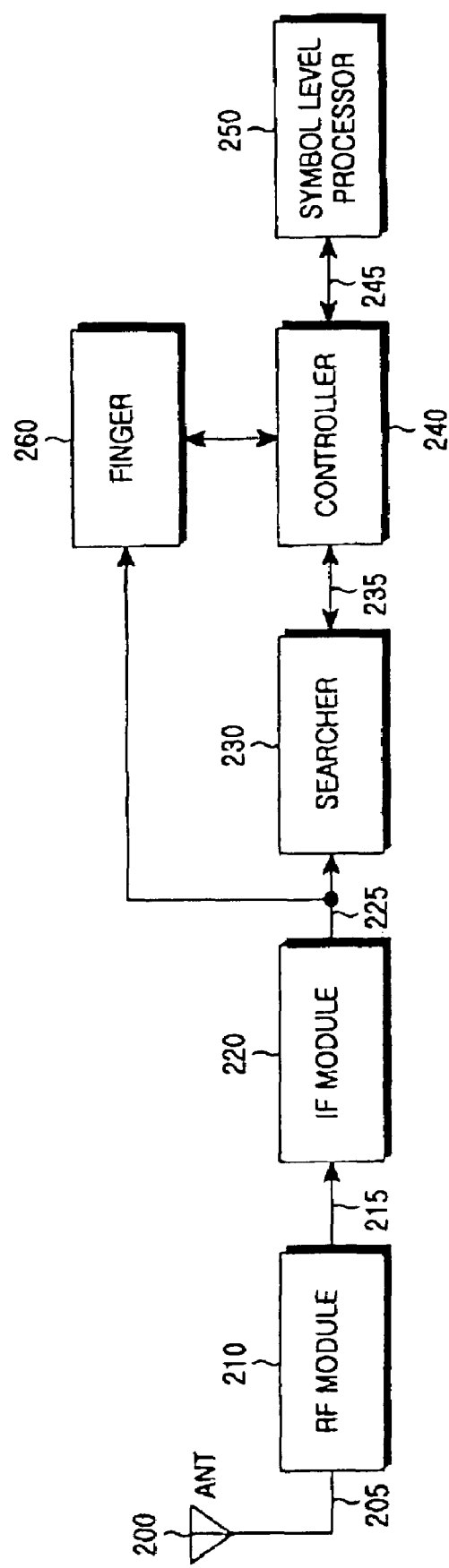
FIG. 2 is a block diagram of a receiver in a UTRAN according to the present invention.

FIG. 2 is a block diagram of a receiver in a UTRAN according to the present invention. Referring to FIG. 2, an RF (Radio Frequency) module 210 downconverts the frequency of an RF signal 205 received through an antenna 200 to an IF (Intermediate Frequency) signal 215 at 70 Hz, usually. An IF module 220 converts the IF signal 215 to a baseband signal 225.

A searcher 230 acquires initial synchronization to the received signal. For initial acquisition, the searcher 230 detects information about the time of receiving a signal to be demodulated. The searcher 230 can be a preamble searcher or a traffic searcher according to its use. The preamble searcher aims to detect the preamble code of a PRACH or a PCPCH (Physical Common Packet Channel). The traffic searcher acquires the time synchronization of a DPCH (Dedicated Packet Channel). The searcher 230 detects a preamble and acquires time synchronization from the baseband signal 225.

A finger 260 demodulates signals received from different paths with different time delays and combines them. Time delay information is fed to the finger 260 from the searcher 230 through a controller 240. The finger 260 also estimates an influence on a radio channel and compensates for the influence to thereby combine signals according to the gains for the paths. The finger 260 performs these operations on the baseband signal 225 using the time delay information.

The controller 240 controls the searcher 230, the finger 260, and a symbol level processor 260, or interfaces between blocks. That is, the controller 240 sends the time delay information received from the searcher 230 to the finger 260, or sends a signal demodulated in the finger 260 to the symbol level processor 250. In addition, the controller 240 manages a signature corresponding to each PRACH and transmits an AICH or a negative AICH as a response for a preamble signature. The symbol level processor 250 recovers a transport channel that delivers a physical channel demodulated in the finger 260 to a higher layer. The symbol level processor 250 takes charge of deinterleaving, rate matching, channel decoding, and CRC (Cyclic Redundancy Check).

When a UE fails to receive an AICH from the UTRAN within a predetermined time after transmitting a preamble signature, it retransmits a preamble, randomly selecting a preamble signature.

When retransmitting a preamble in the case of a plurality of PRACHs, the UE is highly likely to select a preamble signature corresponding to an available PRACH. For this purpose, the UTRAN makes no response instead of transmitting a negative AICH, if collision occurs between preamble signatures after receiving a preamble signature from the UE, that is, a PRACH corresponding to the preamble signature is in current use or different UEs access using preamble signatures corresponding to the same PRACH in the same slot. Then the UE randomly selects a new preamble signature and retransmits the preamble signature to the UTRAN. In this case, the power of the preamble signature is increased and thus the power of an RACH is also increased as much. In case of negative AICH, the UE must wait for a back-off delay, while it needs to wait until it transmits the next preamble signature in this method. Therefore, despite collision between preamble signatures, system access time is reduced. As a result, the UE does not recognize the collision itself.

Figure 3:
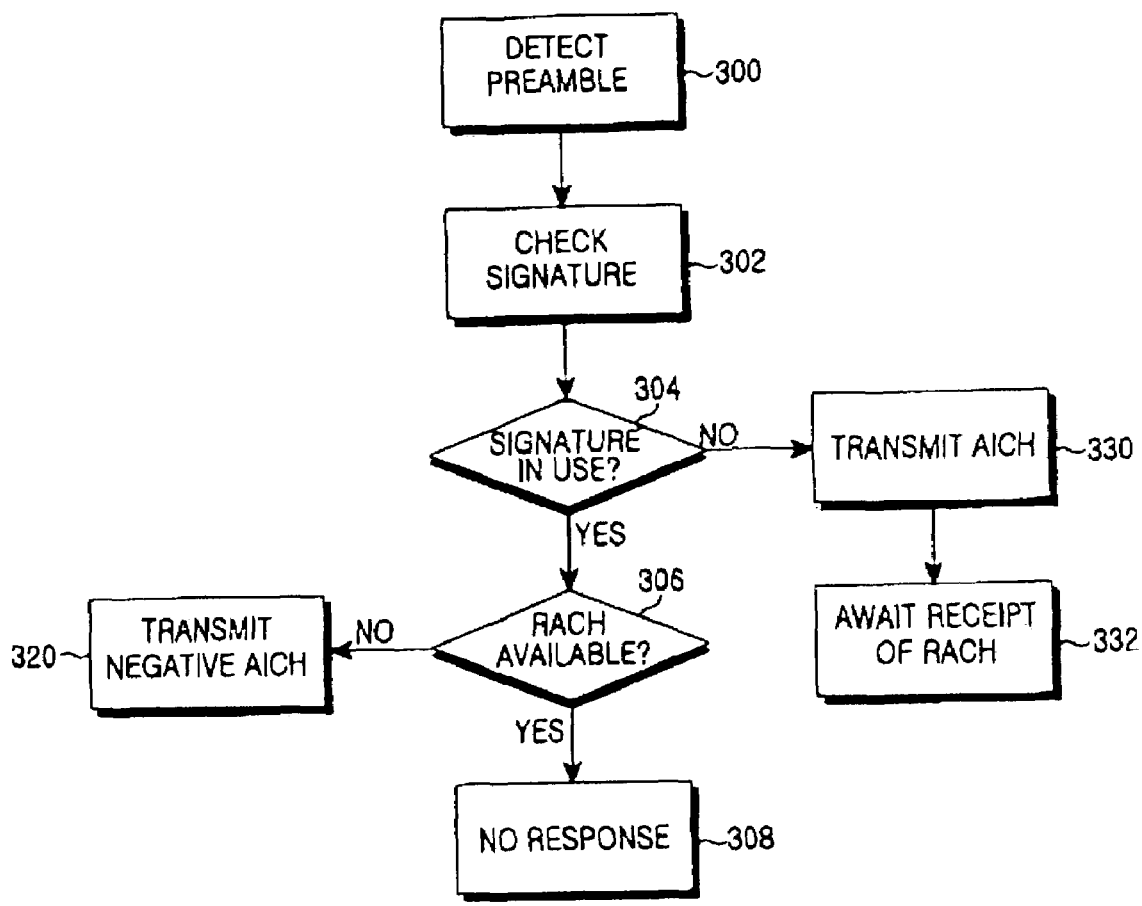
FIG. 3 is a flowchart illustrating a UTRAN operation after receiving a preamble signature from a UE according to the present invention.

FIG. 3 is a flowchart illustrating an operation of a UTRAN after receiving a preamble signature from a UE.

Referring to FIG. 3, upon receipt of a preamble from the UE, the UTRAN demodulates the preamble using a scrambling code in step 300 and checks a preamble signature in step 302. In step 304, the UTRAN determines whether the signature is in current use. If the signature is not currently used, the UTRAN transmits an AICH to the UE in step 330 and awaits receipt of an RACH from the UE in step 332.

On the other hand, if the signature corresponds to an RACH in use, or if there is another signature that corresponds to the same RACH in the same slot, the UTRAN determines whether there is a signature corresponding to an available RACH in step 306. If all signatures are in use, the UTRAN transmits a negative AICH to the UE so that the UE waits for a back-off delay in step 320. If there is an available signature, the UTRAN makes no responses in step 308. Then the UE randomly selects a new preamble signature, considering that the UTRAN failed to receive preamble transmitted by the UE. Here, the back-off delay is not involved.

In accordance with the present invention, when there are available RACHs, one of them is selected in a system supporting a plurality of RACHs, so that despite collision between preamble signatures, the increase of access time to a UTRAN is prevented. In the case where different UEs access the system using signatures corresponding to the same RACH, one of them can use the RACH and the others can access the next access slots, thereby reducing an average access time. As a result, system utilization is maximized and system performance is increased.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of reducing access time to a UTRAN (UMTS Terrestrial Radio Access Network) in a UMTS(Universal Mobile Telecommunication System) when a UE (User Equipment) attempts an access to the UTRAN via an RACH (Random Access Channel) in the UMTS system having at least one UTRAN and at least one UE to which at least one RACH is available, comprising the steps of:

determining whether a preamble signature is in current use upon receipt of the preamble signature from the UE;

transmitting a positive AICH (Access Indicator Channel) to the UE if the preamble signature corresponds to an available RACH;

determining whether there is a signature corresponding to an available RACH if the preamble signature corresponds to an RACH in current use; and transmitting a negative AICH to the UE if all signatures are in use, wherein if there is an available signature neither the positive AICH nor the negative AICH is transmitted to the UE.

2. A method of reducing access time to a UTRAN (UMTS Terrestrial Radio Access Network) in a UMTS(Universal Mobile Telecommunication System) when a UE (User Equipment) attempts an access to the UTRAN via an RACH (Random Access Channel) in the UMTS system having at least one UTRAN and at least one UE to which at least one RACH is available, comprising the steps of:
  determining whether a preamble signature is in current use upon receipt of the preamble signature from the UE;
  transmitting a positive AICH (Access Indicator Channel) to the UE if the preamble signature corresponds to an available RACH;
  determining whether there is a signature corresponding to an available RACH if the preamble signature corresponds to an RACH in current use;
  transmitting a negative AICH to the UE if all signatures are in use; and
  upon receipt of more than one preamble signature corresponding to the same RACH, transmitting the positive AICH for one of the signatures if the RACH is available, and transmitting the negative AICH for the other signatures only if there are no available RACHs.

* * * * *